(12) United States Patent
Fitzgerald et al.

(10) Patent No.: US 9,206,058 B2
(45) Date of Patent: Dec. 8, 2015

(54) WATER PURIFICATION AND ENHANCEMENT SYSTEMS

(75) Inventors: Eugene A. Fitzgerald, Windham, NH (US); Ya-Hong Xie, Dana Point, CA (US); Thomas Langdo, Cambridge, MA (US); Richard Renjilian, Gurnee, IL (US); Carl V. Thompson, Acton, MA (US)

(73) Assignee: THE WATER INITATIVE, LLC, Boca Raton, FL (US)

( * ) Notice: Subject to any disclaimer, the term of this patent is extended or adjusted under 35 U.S.C. 154(b) by 744 days.

(21) Appl. No.: 13/137,507

(22) Filed: Aug. 22, 2011

(65) Prior Publication Data

US 2012/0125203 A1    May 24, 2012

Related U.S. Application Data

(63) Continuation-in-part of application No. PCT/US2010/024531, filed on Feb. 18, 2010.

(60) Provisional application No. 61/154,070, filed on Feb. 20, 2009.

(51) Int. Cl.
*B01D 27/14* (2006.01)
*B01D 36/02* (2006.01)
(Continued)

(52) U.S. Cl.
CPC .............. *C02F 1/004* (2013.01); *B01D 27/146* (2013.01); *C02F 1/003* (2013.01); *C02F 1/008* (2013.01); *C02F 1/281* (2013.01); *C02F 1/283* (2013.01); *C02F 1/68* (2013.01); *C02F 1/688* (2013.01); *C02F 2101/103* (2013.01)

(58) Field of Classification Search
CPC .... B01D 24/007; B01D 27/14; B01D 27/146; B01D 36/00; B01D 36/02; B01D 37/00; C02F 9/00; C02F 9/005; C02F 2101/103; C02F 2101/36; C02F 2101/30; C02F 1/001; C02F 1/003; C02F 2209/29; C02F 2209/36; G01N 2021/8571; G01N 33/18; G01N 33/1813; G01N 33/1826
USPC ........... 210/85, 96.1, 96.2, 257.1, 257.2, 259, 210/263, 264, 266, 502.1, 510.1, 660, 663, 210/669, 764, 662, 691, 284, 291, 911, 912, 210/908; 73/61.41, 61.63, 61.71; 436/73
See application file for complete search history.

(56) References Cited

U.S. PATENT DOCUMENTS 2,781,312 A * 2/1957 Klumb et al. ................... 210/94
4,728,798 A * 3/1988 Fukuda et al. ............. 250/484.4
(Continued)

FOREIGN PATENT DOCUMENTS

CN    1656025 A    8/2005

OTHER PUBLICATIONS

PCT International Preliminary Report on Patentability, dated Sep. 1, 2011; International Application No. PCT/US2010/024531, International Filing Date Feb. 18, 2010 (8 pgs).
(Continued)

*Primary Examiner* — Joseph Drodge
(74) *Attorney, Agent, or Firm* — Nixon & Vanderhye P.C.

(57) ABSTRACT

Water purification system comprising filtration media sized with respect to each other to allow a first contaminant in the water to saturate the first medium with a delay prior to saturation of the second medium with a second contaminant.

25 Claims, 10 Drawing Sheets

(51) Int. Cl.
*C02F 1/00* (2006.01)
*C02F 9/00* (2006.01)
*G01N 33/18* (2006.01)
C02F 1/28 (2006.01)
C02F 1/68 (2006.01)
C02F 101/10 (2006.01)

(56) References Cited

U.S. PATENT DOCUMENTS

| | | | |
|---|---|---|---|
| 4,769,143 A | 9/1988 | Deutsch et al. | |
| 5,149,437 A * | 9/1992 | Wilkinson et al. | 210/665 |
| 5,178,768 A * | 1/1993 | White, Jr. | 210/663 |
| 5,445,965 A | 8/1995 | Stone | |
| 5,626,761 A * | 5/1997 | Howery et al. | 210/651 |
| 6,428,687 B1 * | 8/2002 | Moretto | 210/100 |
| 6,818,130 B1 * | 11/2004 | Varriale et al. | 210/266 |
| 7,309,418 B2 * | 12/2007 | Joyce et al. | 210/95 |
| 7,497,957 B2 * | 3/2009 | Frank | 210/739 |
| 7,625,492 B2 * | 12/2009 | Jin et al. | 210/638 |
| 8,404,210 B2 * | 3/2013 | Hussam | 423/580.1 |
| 2001/0052495 A1 | 12/2001 | Friot | |
| 2003/0096702 A1 | 5/2003 | Frazier | |
| 2004/0149634 A1 | 8/2004 | Hughes | |
| 2005/0074380 A1 * | 4/2005 | Boren et al. | 423/1 |
| 2005/0077246 A1 | 4/2005 | Pardini et al. | |
| 2005/0109700 A1 | 5/2005 | Bortun et al. | |
| 2005/0150836 A1 * | 7/2005 | Williams | 210/662 |
| 2006/0186053 A1 | 8/2006 | Bethke | |
| 2008/0011662 A1 | 1/2008 | Milosavljevic et al. | |
| 2008/0020096 A1 * | 1/2008 | Blum et al. | 426/66 |
| 2008/0087596 A1 * | 4/2008 | Bommi et al. | 210/232 |
| 2008/0202992 A1 * | 8/2008 | Bridges et al. | 210/85 |
| 2008/0301730 A1 * | 12/2008 | Huang | 725/38 |
| 2008/0308484 A1 * | 12/2008 | Deb et al. | 210/257.1 |
| 2009/0008318 A1 * | 1/2009 | Anes et al. | 210/262 |
| 2009/0314703 A1 * | 12/2009 | Beach et al. | 210/232 |
| 2010/0206799 A1 * | 8/2010 | Leavitt et al. | 210/314 |
| 2010/0237018 A1 * | 9/2010 | Hollebone et al. | 210/662 |

OTHER PUBLICATIONS

International Search Report for PCT/US2010/024531, mailed Sep. 16, 2010.
Rospatent Federal State Institution, Federal Institute on Industrial Property of the Federal Service on Intellectual Property, Patents and Trademarks; Notification on a Positive Result of Formal Examination issued in Russian Patent Application No. 2011138381/05 (057291) filed Feb. 18, 2010.
PCT International Search Report and Written Opinion issued in International Application No. PCT/US2010/024531, filed Feb. 18, 2010 (10 pgs).
First Office Action issued by Chinese Patent Office in Chinese patent Application No. 201080008752.2, mailed Aug. 2, 2013, English Translation (8 pgs).

* cited by examiner

Figure 8

| Volume of Water Treated (L) | Untreated Water Arsenic Level (mg/L) | Treated Water Arsenic Level (mg/L) |
|---|---|---|
| 1 | 0.047 | 0.001 |
| 1267 | 0.058 | 0.001 |
| 2534 | 0.059 | 0.004 |
| 4435 | 0.052 | 0.008 |
| 5702 | 0.045 | 0.001 |
| 6970 | 0.05 | 0.001 |

WATER PURIFICATION AND ENHANCEMENT SYSTEMS

This application is a Continuation-In-Part of International Application No. PCT/US2010/024531, filed 18 Feb. 2010, claims the benefit of U.S. Provisional Application No. 61/154,070, filed 20 Feb. 2009, the entire contents of each of which are hereby incorporated by reference.

The present invention relates to a low-cost potable water purification system and a sensor to alert the user when the water is no longer safe to drink. This low-cost water purification system incorporates additional functionality that enables beneficial impurities and molecules to be added to the water.

BACKGROUND OF THE INVENTION

Water purification systems can be comprised of many different components using various mechanisms for removing impurities from water. One class of prior water purification systems is commonly referred to as 'point-of-use' (POU) water purification systems. Such POU systems are composed of components that remove water impurities on a relatively small scale, e.g. a table-top or dwelling-oriented system as opposed to a large central facility, like a municipal water treatment facility.

POU systems in general have been constructed for high-end marketplaces, i.e., markets where higher costs in POU systems can be tolerated. POU systems have not effectively penetrated large but lower-end marketplaces due to the lack of inventive design in low-cost environments.

A typical POU system may have a pre-filter to remove sediment, followed by mechanisms that ensure pathogen and sometimes inorganic material removal. One of the most important aspects of a POU system which contains consumables, such as filters, is an 'end-point' detection system that warns user or service personnel that the time to change the filter has arrived. Most POU systems use a time-based system where, after a certain amount of time has passed, a light turns on (or some other indicator) which signals that it is time to change the filter. This relatively low cost sensor is not adequate. If the water purification system is deployed in different environments, the required length of time between filter changes to avoid contamination can vary greatly, thus possibly exposing individuals to contaminated water.

The main method of determining water composition (and safety) is to periodically take samples of the water and ship these samples to a laboratory where relatively complex equipment is used to analyze the water composition. This information supplies feedback to the user or service personnel of what is in the water. In addition, there are field-kits which can test for particular contaminates, e.g. chlorine. Generally, neither of these standardized test methods is either universal enough or compatible with a POU water system. Likewise, neither of these test methods is consumer friendly.

Current POU water purification systems do not add beneficial ingredients to the water. Typical systems that impart molecules or compounds into water are found in the confectionery or restaurant businesses. A soda fountain, for example, adds molecules and compounds that add flavor to carbonated water by simply mixing streams of liquids, but not ingredients beneficial to the consumer's health.

A need exists for an improved system for purifying water and/or adding beneficial ingredients to the water. The present invention seeks to satisfy this need.

SUMMARY OF THE INVENTION

In one aspect, there is provided a water purification system comprising at least two filtration media sized with respect to each other to allow a first contaminant in the water to saturate the first medium with a delay prior to saturation of the second medium with a second contaminant. In another aspect, there is provided a method of purifying water comprising passing water through a system comprising at least two filtration media sized with respect to each other to allow a first contaminant in the water to saturate the first medium with a delay prior to saturation of the second medium with a second contaminant.

An important aspect of the present system is to employ the user of the system as the end-point detector prior to being exposed to pathogens or other dangerous elements. This aspect of the system allows for the ultimate in low-cost water purification and water safety. The present inventive system employs the user as a detector through the user's sight or taste. A mechanism in the water purification system releases a color element when the water filter has reached or is beginning to reach the end of its life. Additionally the system also has the ability to release a different taste in the water which also can alert the user that the filter has reached its end of life. In addition, since these detection mechanisms are introduced in a low-cost manner, the same mechanisms can be utilized to impart desired molecules or compounds into purified water, thus creating healthy beverages and/or therapeutic drinks.

BRIEF DESCRIPTION OF THE DRAWINGS

FIGS. 7 and 8 show arsenic removal results of the combination AC/GFO filter on Chapala water over the lifetime of the filter;

DETAILED DESCRIPTION OF THE INVENTION

Figure 1:
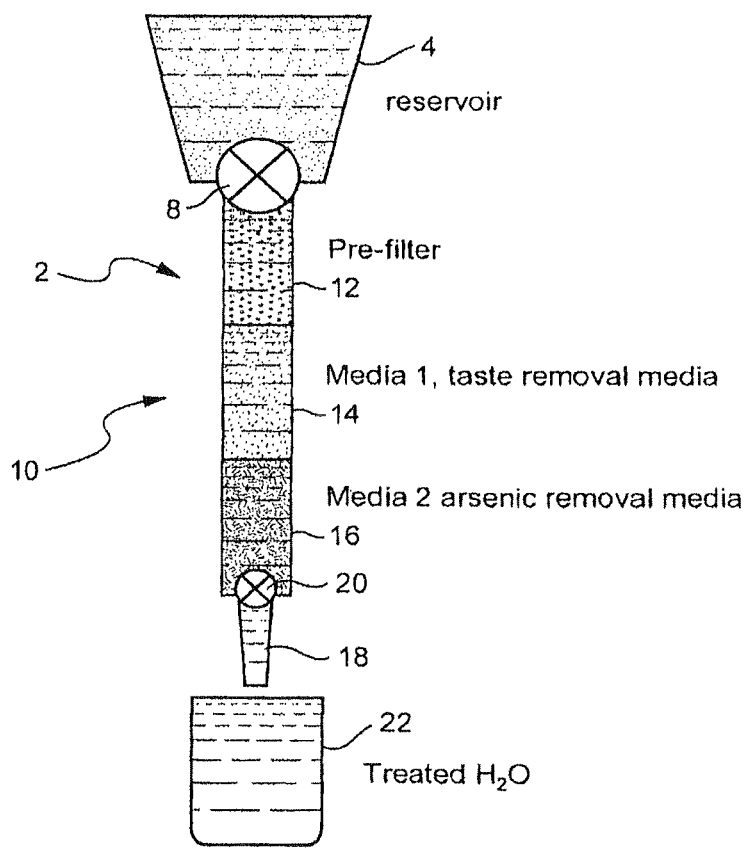
FIG. 1 is a schematic of a first embodiment of the present invention showing a low-cost arsenic purification system.

Referring to the drawings, FIG. 1 is a schematic of a first embodiment of the present invention of a low-cost arsenic purification system. The system 2 comprises a reservoir 4 for containing water to be purified connected via a valve 8 to a filter region 10 having a series of remediation medias 12, 14, 16. Water passing through the filter region 10 exits through nozzle 18 via valve 20 into receiving vessel 22.

The prefilter 12 is designed to eliminate large particles and sediment from the water. The pre-filter 12 is followed by a series filter medias which are designed to remove targeted atoms, molecules, or compounds from the water and/or may be employed to impart either a color or taste change to the water when the media are saturated with contaminates and the media is no longer purifying the water (i.e., the invention indicates that the water will soon be unsafe). In the particular embodiment illustrated in FIG. 1, the prefilter media 12 is followed by a taste removal media 14, and an arsenic removal media 16.

Similar mechanisms can be employed to inject other beneficial compounds into the water. Beneficial compounds can be, for example, vitamins, amino acids, minerals, and/or herbal extracts. Some examples include vitamin A, vitamin C, vitamin D, and vitamin E, vitamin K, vitamin $B_6$, vitamin $B_{12}$, thiamin, riboflavin, niacin, folic acid, biotin, pantothenic acid, calcium, iron, phosphorus, iodine, magnesium, zinc, selenium, copper, manganese, chromium, molybdenum, potassium, boron, nickel, silicon, tin, vanadium, lutein, and lycopene.

The system of the invention is primarily designed for treatment of water which has been disinfected with chlorine. As noted above, one of the remediation medias 14 may be designed to remove undesirable tastes, and the other 16 may be chosen to remove arsenic.

Different geographical areas may have different water problems and, hence, may require adjustment of the media types, number of medias, or media ratios to properly remove contaminants. The filter system is designed with an appropriate empty bed contact time (EBCT) for each of the medias to allow sufficient removal of the target contaminants. Typical EBCTs are on the order of 1 to 10 minutes, and these guidelines determine water flow rates through the media filter volume.

The purification system may include additional filter stages after the remediation medias described above (not shown). For example, a filter to remove media fines (such as a fiber wound filter) and/or a filter to remove microbial contaminants may be implemented after the remediation media stages. Common causes of water taste problems are algal metabolites such as geosmin, or 2 methylisoborneol (MIB) which impart musty or earthy tastes to the water. (See for example, chapter 26 in *Adsorption by Carbon*, edited by Bottani and Tascon). Although the order of the media in the present system is not critical, in the embodiment illustrated in FIG. 1, the taste removal filter media 14 is positioned immediately following the prefilter media 12, followed by the arsenic removal media 16.

In other embodiments, the medias may be intermixed, alternating, or stacked. Additionally, although there are other potential media that can perform both tasks described above, activated carbon (also referred to as activated charcoal) is typically selected as the taste removal filter media 14, and one or more of granular ferric hydroxide, activated alumina, granular ferric oxide, titanium oxide, zirconium oxide, or another metal oxide or mixture of metal oxides may be selected as the arsenic removal media 16.

The design of the system of the invention is very low cost for two principal reasons. First, the system is targeted at the two primary problems arising with the water, namely the toxic arsenic concentration and the undesirable taste. Secondly, the method of end-point-detection is either time, or more importantly, taste. The system is able to employ user taste as an end-point detection mechanism by sizing the taste-removal media and the arsenic-removal media such that the taste-removal media is saturated before the arsenic-removal media is saturated. When these media volumes are sized as described, the taste removal media breaks through first, and the water will possess an undesirable musty or earthy taste for some time period of delay before the water begins to be contaminated with arsenic.

Figure 2:
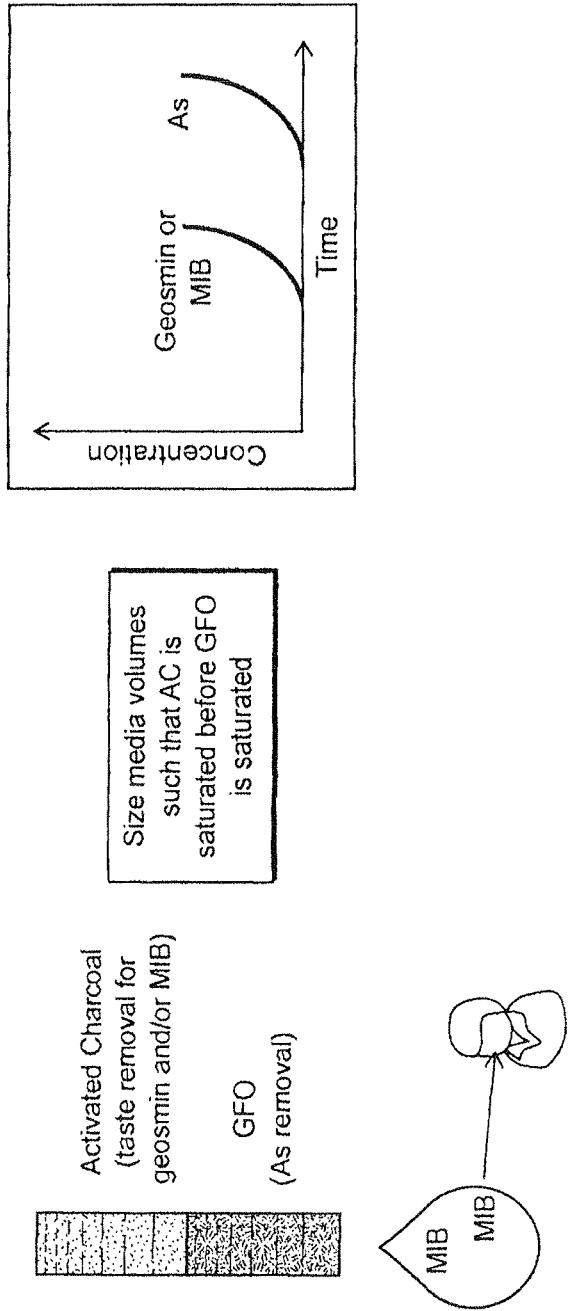
FIG. 2 illustrates how taste removal media breaks through first and the water will possess an undesirable musty or earthy taste for some time period of delay before the water begins to be contaminated with arsenic.

This effect is represented schematically in the graph shown in FIG. 2. The sizing of the volume media to arrive at this functional effect, in which the user is the sensor since the user is signaled to replace the media when an earthy or musty taste is sensed in the water, is accomplished in a series of steps as described below.

First, the local water is measured to determine the level of taste imparting compounds such as geosmin or MIB and the level of arsenic in the water. Secondly, the taste and arsenic removal media is tested to determine how long it will take a volume of media to be saturated with geosmin and/or MIB or arsenic. Once this second step is complete, volumes of the media in the system can be chosen to achieve the effect shown in FIG. 2.

For example, a two component POU filter can be constructed with activated carbon for taste improvement and granular ferric oxide (GFO) for arsenic removal. By appropriately sizing the medias, the taste improvement serves the function of an early warning system for the user that it is time to replace the filter. The relevant parameters are the media adsorption capacities for target contaminants, typically listed in mg contaminant adsorbed per gram of media. The adsorption capacity of MIB on activated carbon is in the range of 1 to 3 mg/g, depending on activated carbon structure (carbon containing source material, pore size distribution, and surface area), and water chemistry. (See for example, Chapter 26 in *Adsorption by Carbon*, edited by Bottani and Tascon, p. 683, (2008)). Similarly, the adsorption capacity of arsenic (V) on GFO is in the range of 0.5 to 1 mg/g depending on water chemistry. (Reference, *Adsorption Treatment Technologies for Arsenic Removal*, AWWA publishing, Chapter 6, (2005)).

A suitable activated carbon can be obtained from Calgon Carbon Corporation (http://www.calgoncarbon.com/solutions/?view=ChallengeProducts&Industry=10&Application=7&Challenge=7). Similarly GFO can be obtained from Severnt Trent Corporation. (http://severntrentservices.com/Water_Wastewater_Treatment/Arsenic_Removal_prod_52.aspx).

For example, it is assumed that, in the input water, MIB and arsenic (V) concentrations are both 0.05 mg/L, and further it is assumed that the adsorption capacity of both contaminants on their respective removal medias is 1 mg/g. Neither GFO nor AC has appreciable adsorption capacity for the other contaminant. Thus, to design a filter where MIB breaks through the activated carbon prior to arsenic break through in the GFO requires a GFO to carbon ratio greater than 1. Suitable ratios could be 2:1=mass GFO:mass activated carbon. Such a ratio would result in an undesirable taste notification to the user that it is time to replace the filter prior to the user being exposed to elevated levels of arsenic. Of course, the overall media masses (and hence filter volume) must be chosen appropriately for the intended water flowrate and filter lifetime. If the concentration of geosmin or MIB is not large enough, the saturation is not abrupt enough, or another suitable taste imparting compound is not present in the water, the method described above cannot be used as an end-point-detection sensor.

If a constant rate of a taste compound is added outside the POU system, the invention has a similar design as shown in FIG. 1 since the geosmin or MIB taste removal media is replaced with a media that removes the intentionally introduced taste compound. Alternatively, the taste substance or compound may be added within the POU system by employing time-release capsules.

Figure 3:
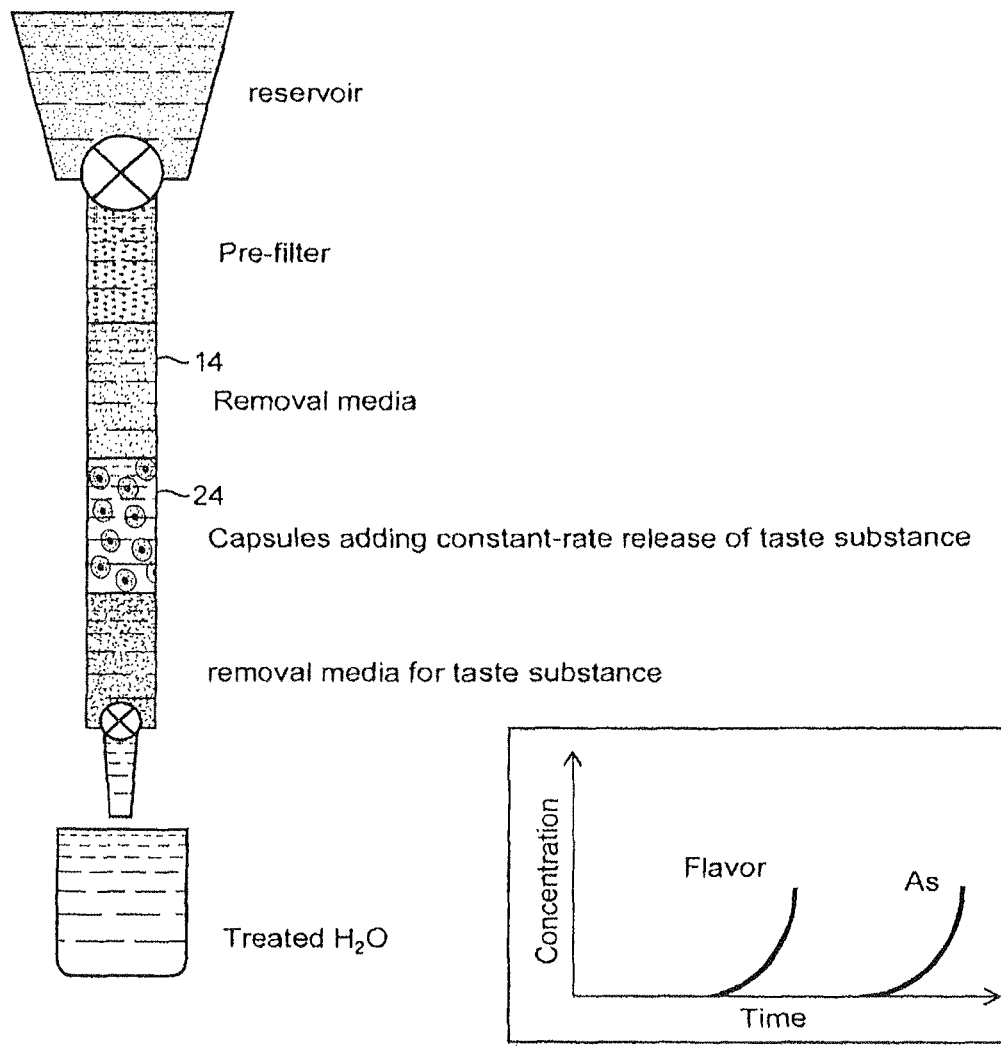
FIG. 3 illustrates how time release capsules can release taste substances at a constant rate which is absorbed by a downstream media and saturates the media at the right time.
Figure 4:
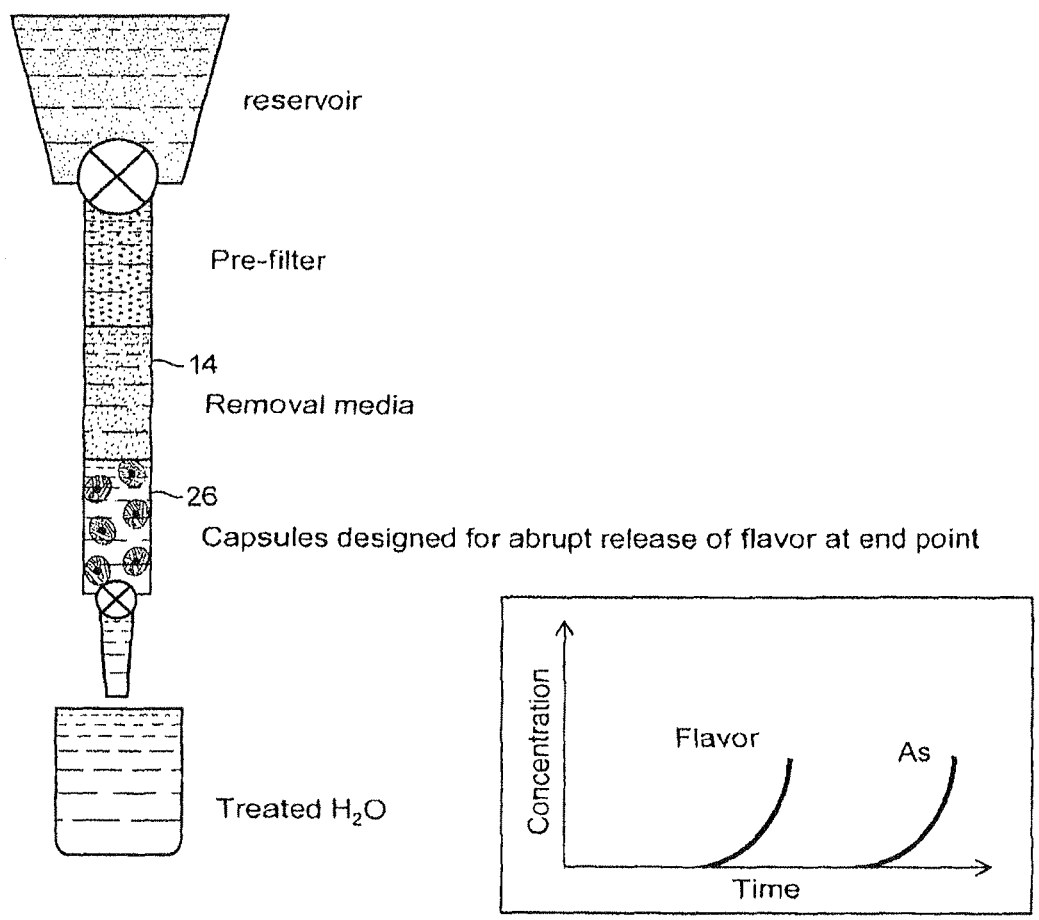
FIG. 4 illustrates how time release capsules are engineered into abrupt-release form which are located in this case at the end of the purification system.
Figure 5:
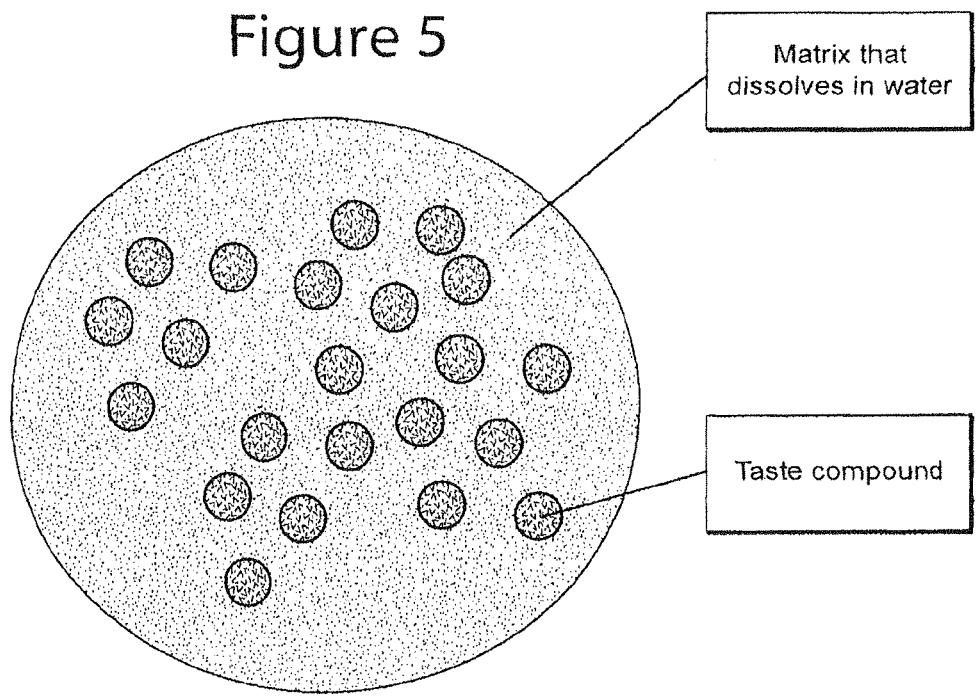
FIG. 5 illustrates time-release capsules designed to inject an even dose of flavor over time.
Figure 6:
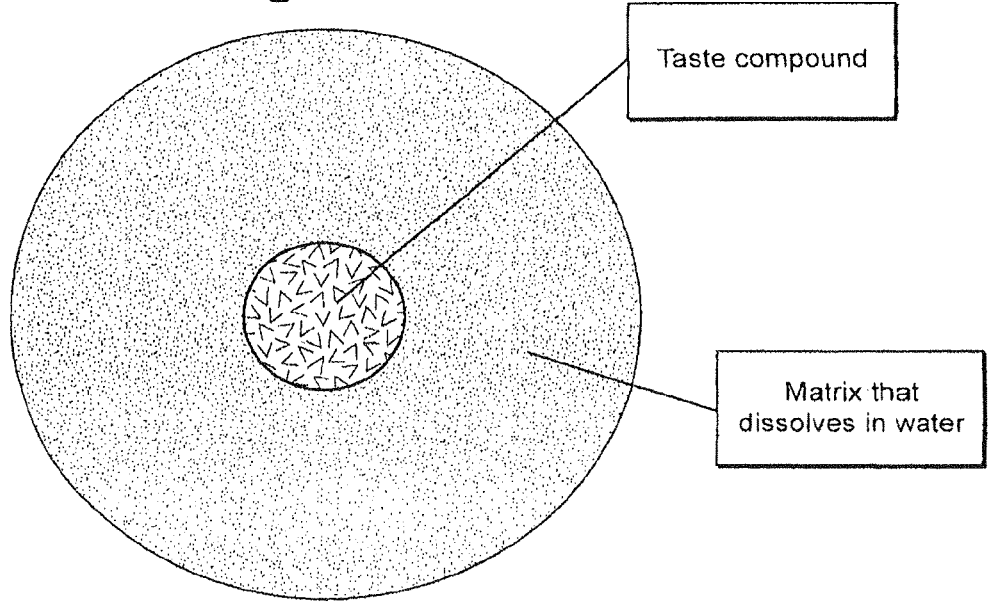
FIG. 6 illustrates a time-release capsule designed so that the outer shell dissolves at a rate such that the flavor is released as abruptly as possible when the arsenic media is about to expire.

FIG. 3 shows a system similar to that shown in FIG. 1 except that a region 24 is provided downstream of the taste removal media 14 containing capsules adding constant rate release of taste substances. These time release capsules can either release taste substances at a constant rate which is absorbed by a downstream media and saturates the media at the right time (as seen in FIG. 3), or the capsules may be engineered into abrupt-release form 26 which are located in this case at the end of the purification system as the last stage (see FIG. 4). In the first case (continuous), the time-release capsules (see FIG. 5) are designed to inject an even dose of flavor over time. In the capsule shown in FIG. 6, this is designed so that the outer shell dissolves at a rate such that the flavor is released as abruptly as possible when the arsenic media is about to expire.

The inventive time-release capsules used in the water purification system of the invention can also be used to release color either in addition to or instead of taste. For example, both methods described above for flavor release can be used for color release. In the first case, the constant-rate-release time capsule can be used to release a color that is absorbed by one of the media in a filter system, and the saturation is planned such that the color compound achieves saturation in the media just before a purification media becomes saturated with an undesirable atom, molecule, or compound(s) which is being removed. Thus, the water will change color when it is time to replace the purification media. A time delay is designed into this system as well, so that even though the water changes color, the water is still safe for some delay time. The delay is designed by understanding the saturation rate of the color compound concentration released by the time-release capsule as well as the saturation of the undesirable atom, molecule, or compound that is being removed.

An abrupt-time-release time capsule can be used as well to impart color in the water to indicate that it is time to replace the purification media. In this embodiment, the outer shell of the time release capsule dissolves at a rate such that color is released abruptly just before the purification media is saturated with the atom, molecule, or compound that it is removing from the water.

The time-release capsules described herein are also useful in adding desirable atoms, molecules, or compounds to the water. The constant-rate time capsules described previously are desirable for this beneficial release. The capsules are loaded into a media, or separately, located at the last stage of the water purification system (so that other media do not remove the desired beneficial atoms, molecules, or compounds). Flavors can be released by these capsules, as well as therapeutic substances such as vitamins.

A key aspect of the invention is the recognition that local water conditions must be carefully assessed in order to choose the most appropriate, lowest cost media for optimum arsenic POU removal with sufficient longevity to produce potable water in amounts suitable for a household. For example, in one particular location, testing determined that the chlorine content, arsenic valence, and pH would need to be primarily considered when choosing the most appropriate arsenic removal media. Likewise, the ratios of the media in the filtration system would have to be adjusted based on the water characteristics and desired longevity and quality of the water post-filtration. Chlorine neutralization requires activated carbon (AC), while arsenic removal requires a metal oxide media such as GFO. In the example above, GFO media was chosen because it exhibits superior As(V) removal at the elevated pHs present in the local water supply compared to other metal oxide medias such as activated alumina. (Reference, *Adsorption Treatment Technologies for Arsenic Removal*, AWWA publishing, Chapter 6, (2005)).

To minimize plumbing connections and reduce unit assembly cost, the medias were combined in a single standard filter housing. It was estimated that 550 g of GFO (1.1 dry liters) would give sufficient arsenic removal capacity under local water conditions to achieve the designed filter lifetime of 7,000 liters. The overall filter volume was fixed to that of a standard 130 cc filter element in the POU device. It was determined that the element containing 1.1 L of GFO and 1.1 L of AC, in a 1:1 media ratio by volume worked best for the conditions present in the example.

Figure 7:
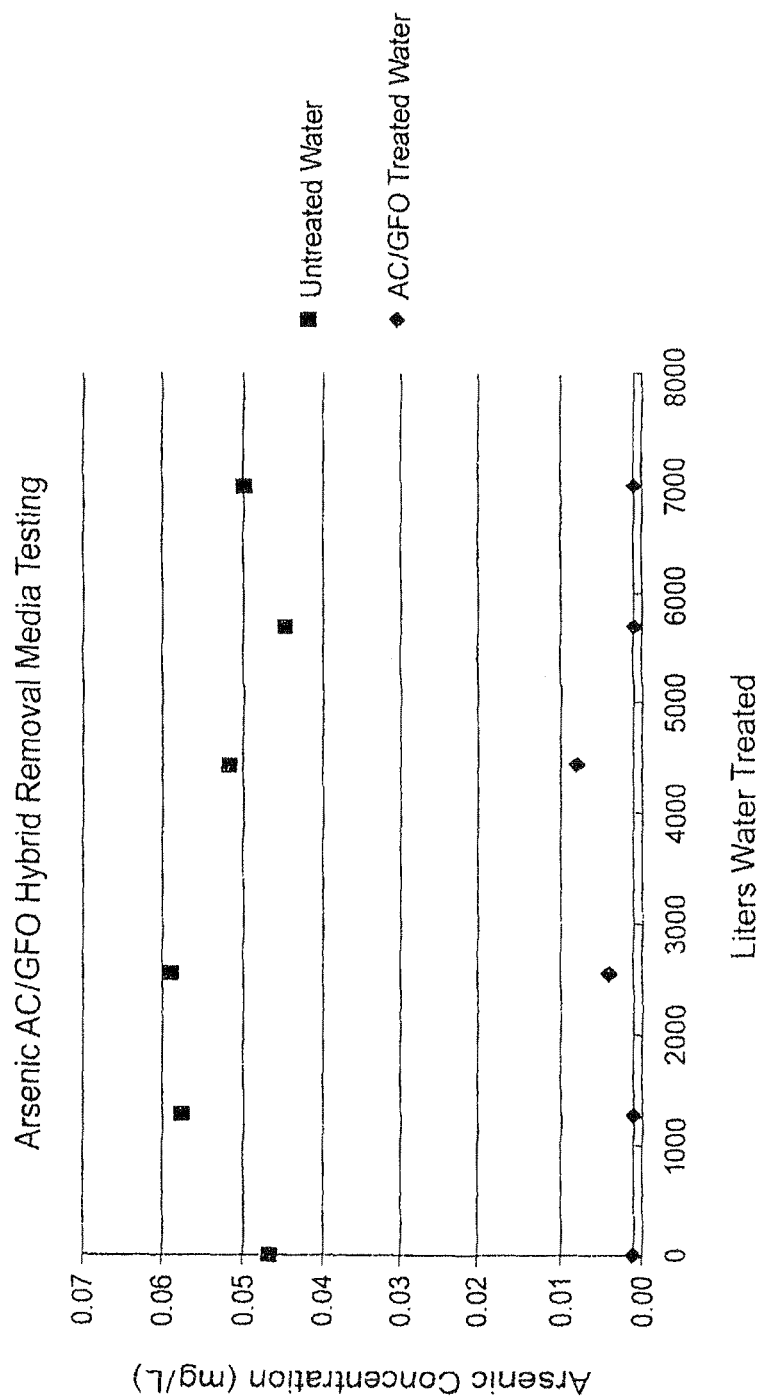

Following the above described process, the media ratios can be adjusted without undue experimentation once the local water characteristics have been assessed. The medias formed two distinct layers, and water flowed through the AC prior to the GFO. FIGS. 7 and 8 show arsenic removal results of the combination AC/GFO filter on Chapala water over the lifetime of the filter. Arsenic is maintained below the 0.01 mg/L limit during the test. In addition, chlorine was not detected in the treated water, resulting in pleasing taste to local residents. Depending on the local water quality factors, POU filter size, and designed operational lifetime the ratios of GFO to AC may be adjusted as required. For small filter sizes present in POU devices, it is expected that proper ratios of GFO arsenic removal media to activated carbon would be approximately 1:1=volume of GFO:volume AC or larger such as 2:1. These volumes should be adjusted for the arsenic removal capacities and densities of different medias appropriate for the local water conditions. Additional medias may be added to the filter elements to remove other water contaminants as required resulting in elements with 3, 4, or more media components. The individual medias may be separated (i.e., layered) as in the above example, or they may be intermixed.

Figure 9:
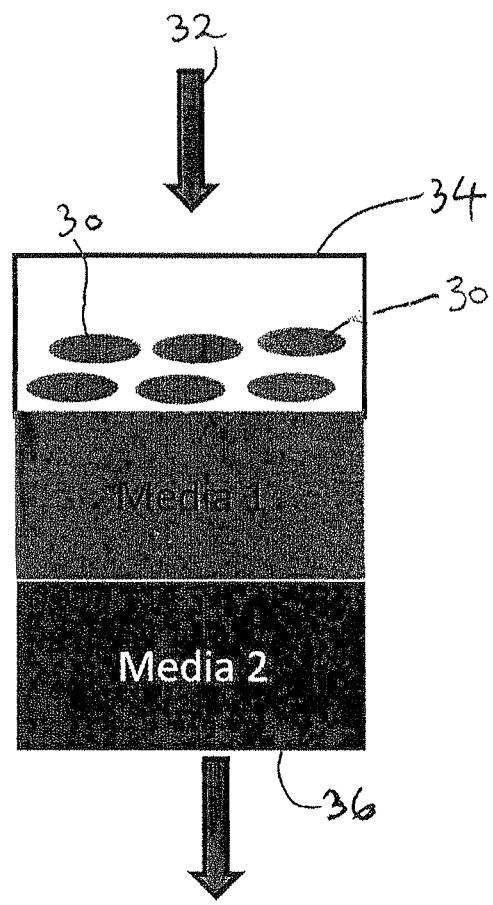
FIG. 9 is a second embodiment where the timed release media is situated before the filter media.
Figure 10:
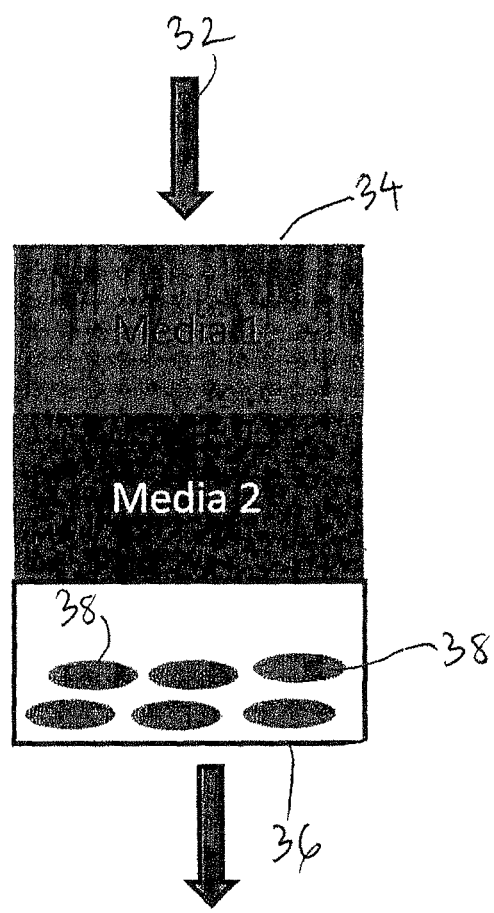
FIG. 10 is a third embodiment where the timed release media is situated after the filter media.
Figure 11:
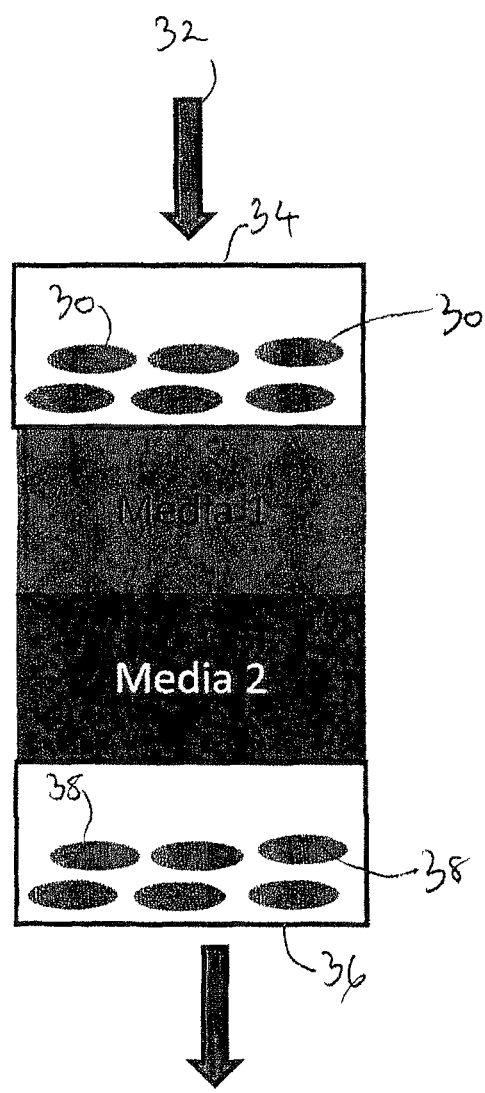
FIG. 11 is a fourth embodiment where the timed release media are situated before and after the filter media.

FIGS. 9-11 illustrate further embodiments where the timed release media is situated before, after or before and after the filter media. In FIG. 9, the timed release media is situated upstream of the filter media and may consist of, for example, beads, capsules or films 30, such as disinfection capsules, pellets, beads, and/or films. Water 32 enters at the top 34 and exits at the bottom 36. The filter may operate under gravity fed conditions or may function under water pressure. Medias 1 and 2 are shown for illustrative purposes but are not limited to two medias, and may range from 1 to N medias, where N is, for example, 1-10. The medias may target, for example, taste improvement, removal of disinfection parent compound, neutralization of disinfection agent after a suitable contact time as required for disinfection, and arsenic removal.

The embodiment of FIG. 10 is similar to that illustrated in FIG. 9, except that the timed release media is situated after the filter media. In this embodiment, the timed release capsules 38 may contain beneficial nutrients such as vitamins, herbal extracts, fruit and/or vegetable extracts and/or tastes, pharmaceuticals and/or neutraceuticals.

The embodiment shown in FIG. 11 is similar to those discussed above with respect to FIGS. 9 and 10 except that the timed release media are situated before and after the filter media. In the embodiment of FIG. 11, the upstream capsules may consist of timed release media, for example beads, capsules and/or films 30, such as disinfection capsules, pellets, beads, and/or films, and the downstream timed release capsules 38 may contain beneficial nutrients such as vitamins, herbal extracts, fruit and/or vegetable extracts and/or tastes, pharmaceuticals and/or neutraceuticals.

In addition to the users' sense of taste and sight, the sense of smell may be used to alert the user to a change in filter performance. For example, in one approach, the user could assess filter performance by detection of chlorine by smell or taste. Activated carbon media could be employed to remove the chlorine which is present in the incoming water after addition in a central treatment plant, or by chlorine addition by the POU device through a time release mechanism. The activated carbon bed would be properly sized such that it saturates prior to saturation of the contaminant bed which is removing arsenic. Once the activated carbon was saturated, the chlorine concentration would increase in the filtered water. This increase in chlorine concentration could be detected by the user through smell or taste. Similarly, this activated carbon bed could be replaced with an activated carbon impregnated membrane, or a copper-zinc (brass) alloy media such as KDF, produced by KDF Fluid Treatment.

The POU system of the invention may be employed in a variety of locations and water conditions. Some water conditions may have inadequate or nonexistent disinfection capabilities such as by chlorine disinfection. This may occur due to inadequate chlorination infrastructure, or because of a disruption of the central treatment disinfection process after a natural disaster or supply pipe rupture. The POU system of the present invention possesses disinfection capability which may be implemented several ways.

In one way, a membrane is provided which mechanically filters out pathogens. This requires use of a membrane with pore sizes comparable and preferentially smaller than the pathogen. In addition, a very tortuous path can be implemented in a filter to trap pathogens when the pore size is larger than the pathogen. Further trapping improvements can occur by the embedding of materials such as activated alumina in the membrane which exhibit surface charges when in water. These surface charges can electrostatically bind viruses and bacteria, resulting in increased capture than would be expected based solely on mechanical pore size measurements.

In another approach disinfection compounds which are beneficial to the user can be added through controlled, time release methods to actively disinfect the water, performing a benefit to the user. The POU filter system of the invention has either or a combination of both approaches.

For the membrane pathogen approach, the system integrates small pore size filters with large surface areas to overcome the limitation of reasonable flows at low water pressures such as gravity fed applications. To mechanically remove protozoan cysts requires membranes with pore sizes on the order of 1 micron, while bacteria require pore sizes on the order of 0.1 micron. The flow of water through a membrane with 0.1 micron pore size is very slow, typically on the order of 1 milli liter per min per cm2 of membrane area. This is too slow to filter a reasonable amount of water under gravity. This area limitation is overcome by the present invention utilizing two different approaches.

In the first approach, the common circular geometries are replaced by the use a rectangular or square filter shape to allow pleating and thus increase the filter area and flow. Using pleating, it is possible to increase filter area by a factor of 10 if 1 inch deep pleats and 5 pleats per inch are used. This larger increase in area allows the practical introduction of small pore size filters such as 0.1 micron filters in a gravity fed POU application. Circular geometries are not easily amenable to pleating, hence the need for a square or rectangular geometry. Thus, in one embodiment, the POU system of the invention combines time release of a halogen disinfectant with a small pore membrane filter which has a surface area greater than that of a flat sheet through pleating or bundling of fibers. In another embodiment, the POU system of the invention combines a small pore membrane filter which is has a surface area greater than that of a flat sheet through pleating or bundling of fibers along with arsenic removal media and has a resulting flow greater than 100 mL/min under gravity fed conditions.

In a second approach, hollow fiber filters are used which are combined strands of filter fibers, greatly increasing the surface area for water transport. Using hydrophilic materials such as PES allows wetting of the hollow fiber filters and operation under gravity fed conditions at 0.1 micron pore sizes. The above approach does not kill pathogens, but establishes a mechanical barrier through membrane pores to eliminate them.

The inventive time-release capsules used in the water purification system of the invention can also be used to release beneficial disinfection compounds in addition to vitamins, herbal extracts, etc. The present invention describes time release methods to actively disinfect the water and kill all types of pathogens from viruses to bacteria to cysts which have advantages over membrane only approaches. This approach may be combined with the membrane approach above, and would be preferred to offer a multi-faceted defense for microorganisms and to eliminate cysts which are resistant to chlorination.

The beneficial disinfection compounds are typically halogen-containing compounds, comprising chlorine, bromine, and/or iodine groups. Disinfection efficacy is predicted by CT products, where C is the concentration of free halogen (such as free chlorine in mg/L) and T is the contact time in min. The EPA publishes guidelines for pathogen disinfection for different CT products and pathogens as can be found in the following reference (US EPA, Guidance manual for compliance with the filtration and disinfection requirements for public water systems using surface water systems, 1989). Some potential disinfection compounds which could be released to create free halogen compounds are sodium hypochlorite, calcium hypochlorite, bromochloro-5,5-dimethylhydantoin, trichloroisocyanuric acid, sodium dichloroisocyanurate dihydrate, 1,3-dibromo-5,5-dimethylhydantoin, and/or 1,3-dichloro-5,5-dimethylhydantoin among others. The requirement is that the sources be liquid or solid, with solid being preferred.

The issue is a controlled release of these potentially dangerous chemicals in a prescribed dosage range over the lifetime of the filter. Too low a concentration results in incomplete disinfection, while too much results in offensive tastes and odors and potential end user harm. Typically, for free chlorine, levels are desired in the range of about 0.2 mg/L to 10 mg/L, with 0.5 mg/L to 5 mg/L being preferred. With those levels of free chlorine a majority of viruses and bacteria are inactivated (99.99%) in approximately 10 minutes according to the EPA reference above.

In industrial settings such as centralized water treatment facilities, this controlled release is achieved through close monitoring and testing of mechanical dosage pumps and the resulting chlorine levels. This level of automation and oversight is not practical in a home POU device. Instead, the invention employs a matrix or coating to hold the disinfection compound and time release it controllably over time into the POU reservoir without user intervention. This controlled release system achieves the required disinfection chemical concentration without input or monitoring by the user safely and controllably. These time release disinfection materials would exhibit sanitizing or biocidal properties to kill pathogens.

Release mechanisms may be grouped into reservoir-type systems with a delivery device where an inert membrane shell surrounds an active agent which upon activation diffuses through the membrane at a finite controllable rate, and matrix systems which have microparticles prepared by extrusion or molding of polymers or fat-congealed capsules where the actives are dispersed in the encapsulating medium (carbohydrate, fat, etc.) A combination release mechanism which is a combination of the reservoir-type and matrix systems is also possible.

In a preferred embodiment, the disinfection time release capsule may be formed by embedding the disinfection compound in a polymer matrix, preferably such that the disinfection compound is homogeneously distributed throughout the matrix. The polymer matrix may be in the form of a sheet, tablet, or hemisphere.

This matrix approach is also suitable to other beneficial compounds such as vitamins, minerals, and herbal extracts. The polymer may be chosen from ethylene vinyl acetate, low or high density polyethylene, polypropylene, polystyrene, or silicone among others. These polymers should all be food contact grade. The fabrication parameters of these polymers such as molding temperature should be chosen such that they do not result in a major degradation of the beneficial compound.

In a preferred embodiment, the polymer is ethylene vinyl acetate and the chlorine source is calcium hypochlorite. The controlled release of the halogen compound is tailored through choice of the chlorine source, the polymer, the chlorine source to polymer ratio, the size of the chlorine source particles, and the method of manufacture which would control the homogeneity of the resulting matrix. The polymer matrix should be more than 10% chlorine source by weight, but less than 90% chlorine source by weight. The result could be a tablet, capsule, hemisphere or sheet which releases the disinfection compound controllably into the filter system to disinfect the water over time. The use of the matrix geometry and any barrier coating is important to control the release rate.

In another embodiment, the halogen disinfection compound is encapsulated by a polymer coating and released by diffusion through the bulk of the coating or shell. Alternatively, the disinfection compound may be embedded in a slow dissolving non-polymer matrix to allow consistent release over time due to the fixed solubility of the host material. This slow release matrix or coating may be a wax, carbohydrate, cellulose, or hydrogel.

The water may be chlorinated to a higher level to kill the pathogens and then the chlorine level can be reduced to a level which is not objectionable to user taste or smell through use of a second media bed such as activated carbon. This controlled release of disinfection compound can serve to protect the user from pathogens as well as alert the user that the arsenic or other media is reaching its useful life and needs to be replaced.

In this scheme, the controlled release of the disinfection compound would need to function longer than the lifetime of the removal media. In addition, it may be required to remove the parent chlorine compound in addition to the free chlorine by proper choice of media.

In addition the above, beneficial compounds introduced may interfere with and be removed by the filtration media. In the above chlorination example, this is desirable. However, in the case of some beneficial compounds such as vitamins, it would be advantageous to allow the beneficial compounds to be released into the water without uptake by the filter. This can be achieved by properly choosing the media order and introduction point for the beneficial compounds.

According to a further embodiment, the invention provides a water purification system as described above which has a membrane for filtering out pathogens present in the water. To this end, the membrane has pore sizes comparable with or smaller than the pathogen. Alternatively, the system of the invention contains time release capsules for time releasing disinfection compounds to disinfect the water. The disinfection compounds are typically selected from chlorine, bromine, iodine and combinations thereof. Sources of disinfection compounds may be chosen sodium hypochlorite, calcium hypochlorite, bromochloro-5,5-dimethylhydantoin, trichloroisocyanuric acid, sodium dichloroisocyanurate dihydrate, 1,3-dibromo-5,5-dimethylhydantoin, and 1,3-dichloro-5,5-dimethylhydantoin. The system of the invention may further include a membrane for filtering out pathogens present in the water and comprising time release capsules for time releasing disinfection compounds to disinfect the water. In one embodiment, the disinfection time release capsule may consist of a disinfection compound embedded in a polymer matrix, for example a halogen disinfection compound encapsulated by a polymer coating and released by diffusion through the bulk of the coating. The disinfection compound may for example be contained within a slow dissolving non-polymer matrix which permits consistent release over time due to fixed solubility of the host material.

In another embodiment, there is provided a system for removing arsenic with a hydraulic loading rate of below 2.5 GPM/ft2 to extend the media bed lifetime.

In another embodiment, the water purification system of the invention has a small pore membrane filter with a surface area greater than that of a flat sheet through pleating or bundling of fibers.

The method of the invention may be carried out by addition of disinfection compounds at a first higher level to achieve disinfection, and then removal to a second lower level prior to ingestion by the user. In this regard, the addition of disinfection compounds may be effected via a polymer matrix where the polymer matrix is ethylene vinyl acetate, and the beneficial compounds may be added in a time release form such that they are not removed by the filter by proper selection of media. In a preferred embodiment, the beneficial compounds are introduced in the last stage of the filtration system.

According to another embodiment, there is provided a point of use water purification system comprising at least one filtration media to remove a contaminant or improve water quality and time release capsules for continuously introducing flavor or a therapeutic substance into the water.

In another embodiment, there is provided a point of use water purification system comprising at least one filtration media to remove a contaminant or improve water quality comprising time release capsules for time releasing disinfection compounds to disinfect the water. The disinfection compounds are typically selected from chlorine, bromine, iodine and combinations thereof. Sources of disinfection compounds may be sodium hypochlorite, calcium hypochlorite, bromochloro-5,5-dimethylhydantoin, trichloroisocyanuric acid, sodium dichloroisocyanurate dihydrate, 1,3-dibromo-5,5-dimethylhydantoin, and/or 1,3-dichloro-5,5-dimethylhydantoin.

The point of use water purification system may comprise at least one filtration media to remove a contaminant or improve water quality comprising a membrane for filtering out pathogens present in the water and comprising time release capsules for time releasing disinfection compounds to disinfect the water. The disinfection time release capsule is typically a disinfection compound embedded in a polymer matrix. The halogen disinfection compound is usually encapsulated by a polymer coating and released by diffusion through the bulk of the coating. Alternatively, the disinfection compound is present in a slow dissolving non-polymer matrix which permits consistent release over time due to fixed solubility of the host material.

In another embodiment, the point of use water purification system is provided with at least one adsorption filtration media to remove arsenic with a hydraulic loading rate of below 2.5 GPM/ft2 to extend the media bed lifetime.

A further embodiment provides a point of use water purification system with at least one adsorption filtration media to remove arsenic, comprising a small pore membrane filter having a surface area greater than that of a flat sheet through pleating or bundling of fibers.

The method is typically carried out by adding disinfection compounds at a first higher level to achieve disinfection, and then removal to a second lower level prior to ingestion by the user.

The invention also provides a point of use water purification system with at least one filtration media to remove a contaminant or improve water quality, in which addition of disinfection compounds is effected via a polymer matrix where the polymer matrix is ethylene vinyl acetate.

The invention further provides a point of use water purification system with at least one filtration media to remove a contaminant or improve water quality further comprising addition of beneficial compounds in a time release form such that they are not removed by the filter by proper selection of media. The point of use water purification system preferably has at least one filtration media to remove a contaminant or improve water quality wherein beneficial compounds are introduced in the last stage of the filtration system.

For example, many organic compounds are removed by activated carbon. If beneficial compounds are to be introduced, it would be advantageous to introduce them after the activated carbon stage in the filter, preferably at the last stage so that there is no interference or uptake by the filter.

To maximize arsenic media life requires proper choice of media and flow conditions. It has been discovered that the hydraulic loading rate has a large effect on media bed lifetime, with lower hydraulic loading rates being advantageous. The present invention provides in one embodiment larger diameter vessels to offset the lower hydraulic loading rates to achieve reasonable flows. Typical media parameters for hydraulic loading from vendors are 8 gpm/ft2.

Based on testing, it has been discovered that lifetime may be dramatically extended by operating filters at much lower hydraulic loadings below 4 gpm/ft2, preferably below 2.5 gpm/ft2. To achieve reasonable flow rates, custom filters were designed that have diameters 5 inches and larger. This approach works with all metal oxide and hydroxide medias including rare earth materials, such as granular ferric hydroxide, activated alumina, granular ferric oxide, titanium oxide, zirconium oxide, cerium oxide, hafnium oxide, lanthanum oxide or another metal oxide or mixtures.

In another embodiment, the beneficial disinfection compounds are added at a first higher level to achieve disinfection, and then removed to a second lower level prior to ingestion by the user.

In a further embodiment, beneficial compounds such as flavors, vitamins, nutrients, etc., are added in a time release form so that they are not removed by the filter by proper selection of media. In a first alternative, the beneficial compounds are introduced in the last stage of the filtration system. In a second alternative, the beneficial compounds (flavors, vitamins, nutrients, etc.) are introduced in a time-release form after the water passes through the filter system, in a reservoir or equivalent.

A yet further embodiment comprises determination by the user of filtration saturation through the use of taste, smell, or appearance and proper sizing of at least 2 medias, one of which removes a harmful contaminant.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating water, comprising the steps of:
   determining levels of contaminants in the water, wherein said contaminants comprise algal contaminants and arsenic;
   testing first and second filter media respectively adapted to remove said algal contaminants and arsenic to determine the length of time for said media to become saturated with said respective contaminants;
   selecting volumes of said respective filter media to achieve treatment of said water and;
   treating said water with said filter media such that said first media becomes saturated with said algal contaminants with a delay prior to saturation of the second media with arsenic contaminants.

2. A method according to claim 1, wherein said filter media are arranged in a point of use (POU) water purification system comprising at least said two filtration media.

3. A method according to claim 2, wherein said at least two filtration media are located upstream of a water reservoir.

4. A method according to claim 2, wherein a prefilter is provided immediately upstream of said at least two filtration media for removal of large particles and sediment from the water.

5. A method according to claim 2, wherein chlorine is a contaminant.

6. A method according to claim 2, wherein a said first filtration media is activated carbon and is adapted to also remove chlorine and said second filtration media is activated alumina, granulated ferric oxide and/or granulated ferric hydroxide.

7. A method according to claim 2, wherein time release capsules are provided to impart flavor to indicate end-point detection of one or more of the filtration media.

8. A method according to claim 2, wherein color time release capsules are provided to impart color to indicate end-point-detection of the filtration media.

9. A method according to claim 2, wherein time release capsules are provided for introducing desirable flavor or a therapeutic substance into the water.

10. A method according to claim 9, wherein the time release capsules are positioned such that the flavor is introduced into the water in a last stage of the system.

11. A method according to claim 2, wherein a membrane is present for filtering out pathogens present in the water, said membrane having pore sizes comparable with or smaller than the pathogen.

12. A method according to claim 2 wherein a membrane is provided for filtering out pathogens present in the water and time release capsules are provided for time releasing disinfection compounds to disinfect the water.

13. A method according to claim 2, wherein a system for arsenic removal is present with a hydraulic loading rate of below 2.5 GPM/ft2 to extend media bed lifetime.

14. A method according to claim 2, wherein a small pore membrane filter is provided having a surface area greater than that of a flat sheet of the membrane filter through pleating or bundling of fibers.

15. A method according to claim 1, wherein the algal contaminants which are tested comprise taste-imparting contaminants comprising geosmin and/or methylisoborneol (MIB).

16. A method according to claim 1, wherein time release capsules are present for time releasing disinfection compounds to disinfect the water.

17. A method according to claim 16, wherein the disinfection compounds are selected from the group consisting of chlorine, bromine, iodine and combinations thereof.

18. A method according to claim 16 wherein the disinfection compounds are selected from the group consisting of sodium hypochlorite, calcium hypochlorite, bromochloro-5,5-dimethylhydantoin, trichloroisocyanuric acid, sodium dichloroisocyanurate dihydrate, 1,3-dibromo-5,5-dimethylhydantoin, and 1,3-dichloro-5,5-dimethylhydantoin.

19. A method according to claim 16 wherein the disinfection time release capsule is a disinfection compound embedded in a polymer matrix.

20. A method according to claim 16 wherein the disinfection compound is a halogen disinfection compound which is encapsulated by a polymer coating and released by diffusion through the bulk of the coating.

21. A method according to claim 16 wherein the disinfection compound in a slow dissolving non-polymer matrix which permits consistent release over time due to fixed solubility of the host material.

22. A method according to claim 16, wherein addition of disinfection compounds is at a first higher level to achieve disinfection, followed by removal to a second lower level prior to ingestion by the user.

23. A method according to claim 16, wherein addition of disinfection compounds is effected via a polymer matrix where the polymer matrix is ethylene vinyl acetate.

24. A method according to claim 16 wherein beneficial compounds are added in a time release form such that they are not removed by the filter.

25. A method according to claim 16 wherein beneficial compounds are introduced in a last stage of the filtration system.

* * * * *